Dec. 3, 1957 N. GEERTSEN 2,815,145
BREAK-OFF KEY FOR KEY OPENING CONTAINER
Filed March 8, 1955
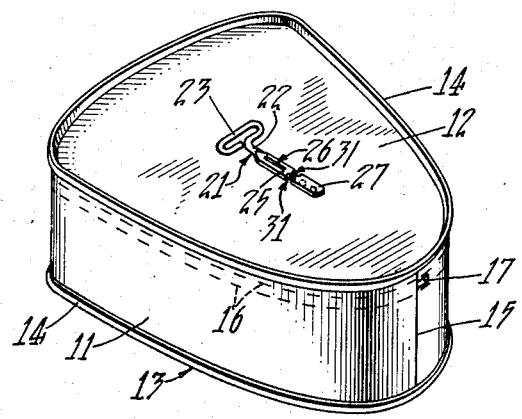
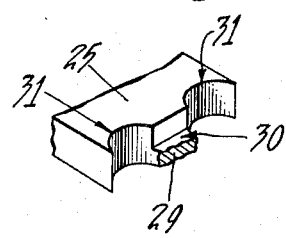
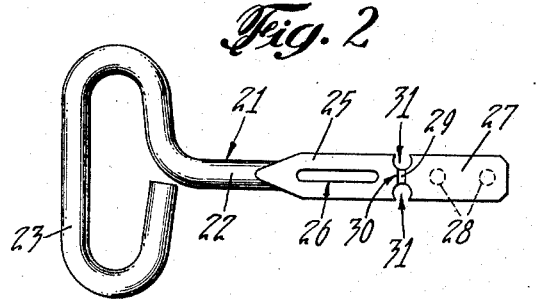
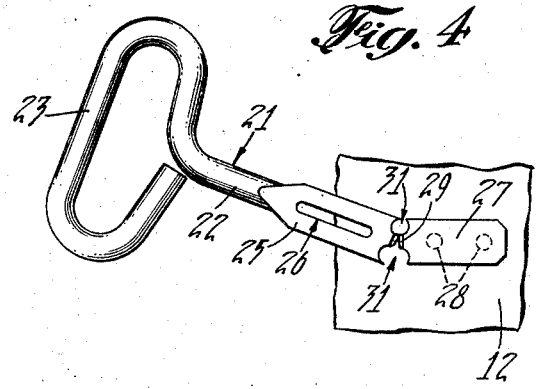
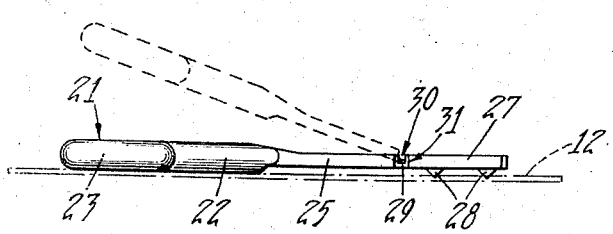
INVENTOR.
NELSON GEERTSEN
BY
ATTORNEYS United States Patent Office 2,815,145
Patented Dec. 3, 1957

2,815,145
BREAK-OFF KEY FOR KEY OPENING CONTAINER

Nelson Geertsen, Oak Park, Ill., assignor to American Can Company, New York, N. Y., a corporation of New Jersey Application March 8, 1955, Serial No. 492,971

1 Claim. (Cl. 220—52)

The present invention relates to tearing strip, key opening, sheet metal cans or containers and has particular reference to an improved break-off opening key for attachment by welding to such cans.

Opening keys for tearing strip cans are used extensively and usually are attached to a can wall by welding because it has been found that welding is the cheapest and most secure way of fastening the keys in place. However in the packaging of whole hams in tearing strip cans and because of their considerable weight it has heretofore been the custom to avoid welded keys because of the danger of tearing out a portion of the can at the weld spots in the event that the head of the key is hit in a lateral direction by the end seam of another can during handling. It has been found that a direct hit against the welded area is usually ineffective against tearing out a portion of the can wall but due to the leverage of the head of the key relative to the welded area a hit against the head usually tears out the weld spots. The tearing out of a portion of a can wall, of course causes the can to leak and admit air which results in spoilage of such a perishable product as hams. In order to safeguard the product the welded keys have been omitted. Soldering of the keys to the cans has been tried in some cases but with unsatisfactory results. The main difficulty with solder is that the heat required to effect a secure bond of the key to the can, unduly scorches the lining inside the can and causes internal corrosion difficulties.

An object of the invention is the overcoming of these difficulties by the provision of an improved break-off opening key which can be welded to a heavy can such as a whole ham can for secure attachment thereto and yet be sufficiently yieldable or readily broken off when struck from any direction without undue strain on the weld spots so as to insure against tearing out any portion of the can and thereby prevent spoilage of the contents of the can.

Numerous other objects and advantages of the invention will be apparent as it is better understood from the following description, which, taken in connection with the accompanying drawings, discloses a preferred embodiment thereof.

Referring to the drawings:

Figure 1 is a perspective view of a tearing strip can having attached thereto a break-off opening key embodying the instant invention;

Fig. 2 is an enlarged top plan view of the opening key shown in Fig. 1;

Fig. 3 is a side elevation of the key shown in Fig. 2; and illustrating by broken lines one manner of breaking key;

Fig. 4 is a view similar to Fig. 2 showing the key partially broken from its welded portion; and Fig. 5 is an enlarged perspective view of a fragmentary portion of the key showing the break made by complete fracture of the key.

As a preferred or exemplary embodiment of the instant invention the drawing illustrates a filled and sealed whole ham can of the tearing strip variety comprising a sheet metal body 11 (Fig. 1) and top and bottom sheet metal end members 12, 13 secured thereto in any suitable manner such as by end seams 14. The body 11 is provided with a side seam 15 and a removable tearing strip defined by a pair of spaced and parallel score lines 16 which encircle the body to facilitate opening of the can. Adjacent the side seam 15 the tearing strip is provided with a tongue 17 for engagement with the slot of an opening key for tearing out or winding up the tearing strip. This is a conventional tearing strip can for whole hams.

Provision is made for removing the tearing strip by use of an opening key 21 which is carried on the can, preferably on its top or bottom end member, and is welded in place for secure attachment thereto. The key 21 preferably comprises a cylindrical wire shank 22 (Fig. 2) having formed on one end thereof an elongated loop or head 23 which serves as a handle for manipulating the key. The opposite end of the shank 22 merges into a flat continuing auxiliary shank 25 containing a longitudinally and centrally disposed slot 26 for receiving the tongue 17 of the tearing strip 16 to initiate removal of the tearing strip.

Beyond the auxiliary shank 25, the key 21 is formed with a similarly flattened tail member or tab 27 which carries on one flat surface thereof a pair of welding projections 28 (Fig. 3) which are utilized in spot welding the tab to the can to hold the entire key in place on the can as hereinbefore mentioned. The tail member or tab 27 is connected to the adjacent end of the slotted auxiliary shank 25 by a reduced or thinned neck section 29 which is readily ruptured or broken when the head of the attached key is lifted as shown in dotted lines in Fig. 3 to break the key off from its welded tail member 27 without disturbing the weld or the portion of the wall of the can to which the member is attached, so that the key may be used to open the can. The neck section 29 preferably is defined by a transverse groove 30 formed in the upper or outer face of the key. The back face of the auxiliary shank 25 and the tab 27 preferably are straight.

Provision is also made for lateral or pivotal movement of the key 21 relative to its tail member 27 as shown in Fig. 4, without disturbing the weld or the wall of the can to which the member is attached. For this purpose the key at the neck section 29 adjacent the outer edges of the key is cut away to form clearance notches 31 on opposite edges of the neck. The notches 31 preferably are circular in shape so as to provide ample space between the auxiliary shank 25 and the welding tab 27 to permit lateral pivoting of the shank relative to the tab as shown in Fig. 4. The notches 31 also reduce the width of the neck section 29 and thereby provide for easy lateral rupture of the neck section. The cross-sectional area of this rupturable neck section preferably is rectangular in shape as best shown in Fig. 5 and is designed to have a rupture strength considerably less than the holding strength of the weld at the tab 27 and the tearing strength of the metal wall of the can to which the tab is welded, so as to insure that any undue strain exerted against the head or shanks of the key will effect displacement of the key or complete separation or break-off from its tab without in any manner disturbing the weld or the wall of the can to which the tab 27 is welded.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

An opening key adapted to be secured substantially flat against a wall of a can by a welded joint at one end of the key, comprising in combination an elongated key shank having at one end a tab for attachment to said wall of a can in a welded joint, a portion of said shank adjacent said tab being notched laterally and grooved transversely to reduce its cross-sectional dimensions relative to contiguous portions of said shank and tab consistent with the strength of the material of the key to provide a weakened neck section rupturable in response to lateral impact pressure exerted against said key substantially parallel to said wall of the can as well as to digital lifting pressure exerted against said key in amount less than the force necessary to break said welded joint to permit detachment of said key from said tab without breaking or disturbing said welded joint and thus prevent tearing out of said welded joint due to inadvertent lateral impact on said key beyond the welded joint.

References Cited in the file of this patent
UNITED STATES PATENTS

| | | |
|---|---|---|
| 2,324,484 | Cereghino | July 20, 1943 |
| 2,369,188 | Then | Feb. 13, 1945 |
| 2,579,466 | Birkland | Dec. 25, 1951 |